July 20, 1937.  H. E. WISE  2,087,680
TAPERED ROLLER BEARING
Filed Jan. 23, 1935  3 Sheets-Sheet 1
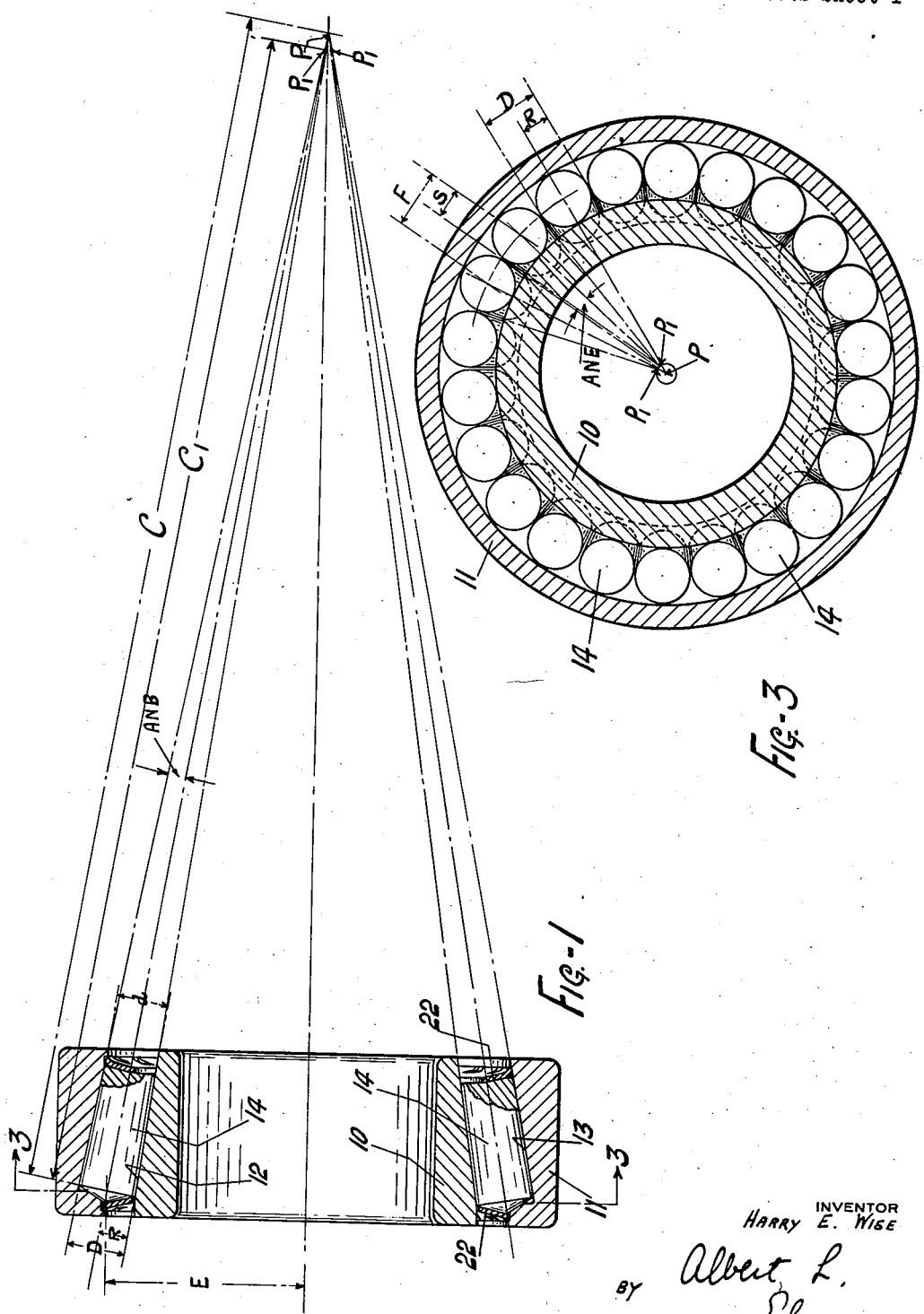
INVENTOR
HARRY E. WISE
BY Albert L. Ely
ATTORNEY

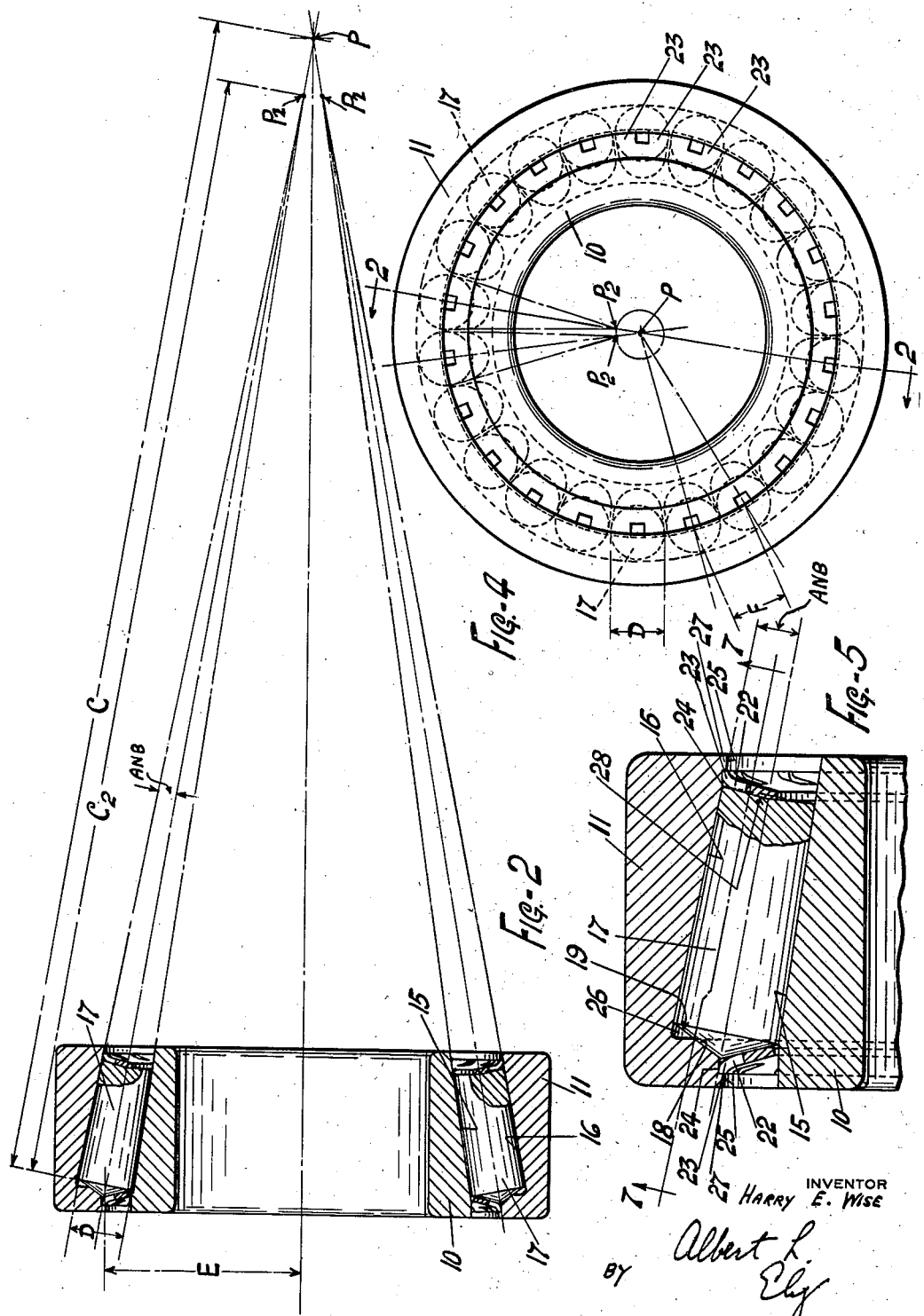

July 20, 1937.  H. E. WISE  2,087,680
TAPERED ROLLER BEARING
Filed Jan. 23, 1935   3 Sheets-Sheet 3

INVENTOR
HARRY E. WISE
ATTORNEY

Patented July 20, 1937

2,087,680

UNITED STATES PATENT OFFICE 2,087,680

TAPERED ROLLER BEARING

Harry E. Wise, Canton, Ohio, assignor of ninety one-hundredths to Alfred F. Curtis, Alliance, Ohio Application January 23, 1935, Serial No. 3,002

32 Claims. (Cl. 308—214)

This invention concerns tapered roller bearings and particularly improvements in operating characteristics and also in longer life of cageless tapered roller bearings wherein tapered rollers are mounted upon and retained in the outer race, thus simplifying construction and providing a commercially acceptable roller bearing.

An object of the present invention is to provide that new, geometric design of a tapered roller bearing whereby better circumferential roller alignment is obtained during the operation of the bearing by a positive force, circumferential in effect, created to cause the larger ends of the frusto-conical rollers to tend to get circumferentially ahead of the smaller ends of the rollers in the circular race tracks, or, more briefly, to cause the larger ends to tend to lead the smaller ends circumferentially, thereby causing a cancellation of that frictional retardation which is effective on the same large ends of the rollers hereinafter explained, and, furthermore, whereby this new, geometric principle tends to decrease the axial roller thrust loads which are effective in generating friction and causing the aforesaid retardation.

Other objects of the present invention are for the purpose of maintaining the effectiveness of the geometric principle whereby the frusto-conical rollers further maintain their own correct radial alignment; also whereby the frusto-conical roller endwise position or axial alignment is better obtained; also whereby essentially rolling action of the roller ends against rib sides preserves said axial alignment; also whereby the internal construction of the bearing causes it to better lubricate itself; and also whereby the roller end faces at both ends of the rollers shall have radial portions thereof to form a common angle with the straight radial lines adjacent said end faces perpendicular to the main longitudinal axis of the bearing whereby a member interchangeably attached will retain the inclined frusto-conical rollers in the outer race adjacent to the large ends and small ends of the rollers whereby said closely related elements form a means of controlling and maintaining the geometric functions aforesaid to insure their continual benefits as hereinafter explained.

A still further object of the invention resides in providing a roller bearing of the type herein referred to which is simple in construction, efficient in operation and inexpensive to manufacture.

With objects above indicated and other objects hereinafter explained in view, my invention consists of the construction and combination of elements hereinafter described and claimed.

Referring to the drawings,

Figure 1 is a longitudinal, sectional view of a tapered roller bearing embodying the present invention;

Figure 2 is a longitudinal, sectional view of a tapered roller bearing with the present invention embodied to a different degree than in Figure 1;

Figure 3 is a transverse, sectional view of the improved bearing taken on line 3—3 of Figure 1;

Figure 4 is an end elevational view of the bearing taken from the left of Figure 2;

Figure 5 is a fragmentary, longitudinal, sectional view of the bearing embodying the present invention and made upon an enlarged scale;

Figures 6, 7:
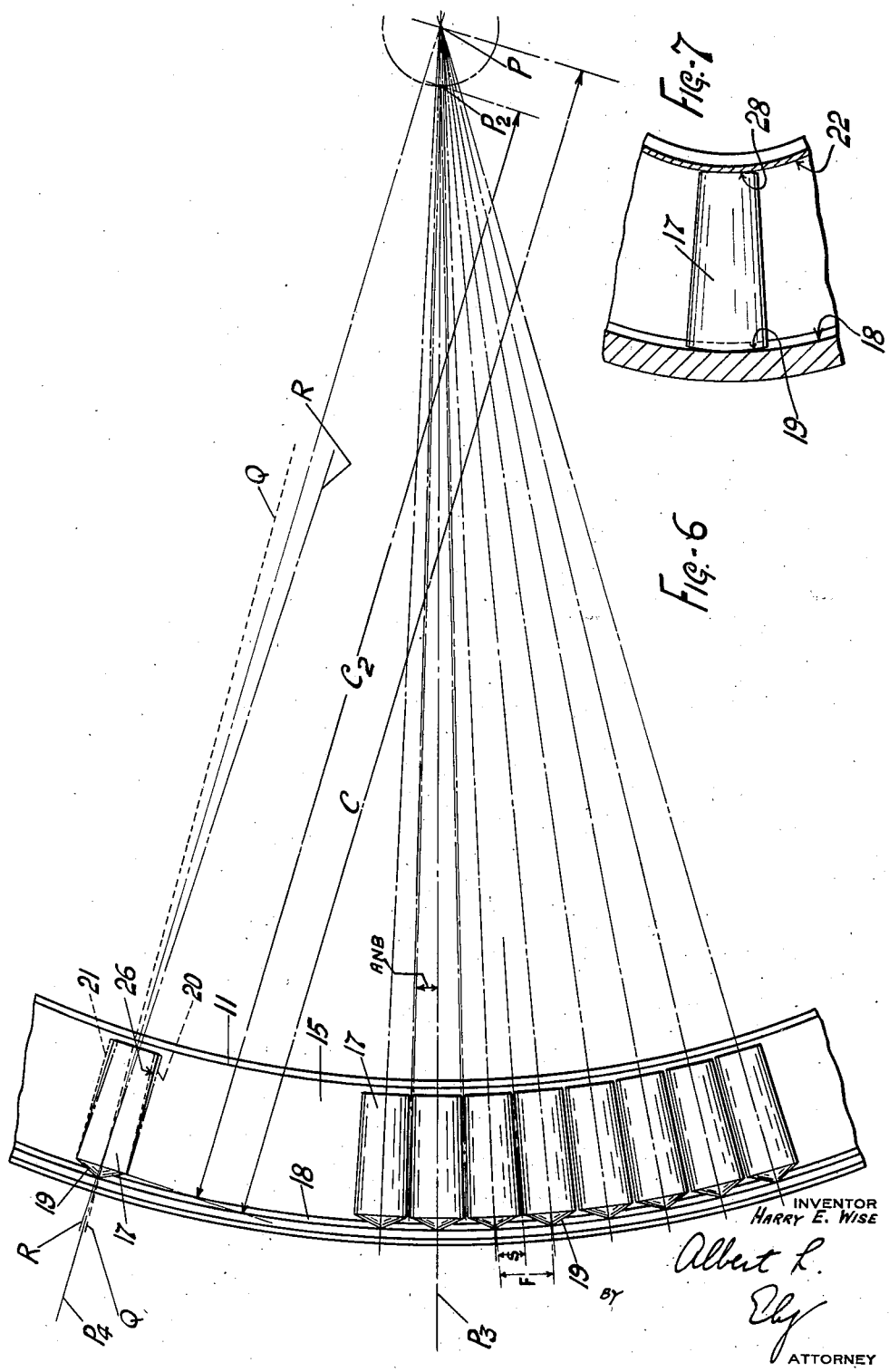
Figure 6 is a diagrammatic, fragmentary, circular race track view of a flat, tapered roller thrust bearing embodying the principle of my invention laid out such that the axes of the rollers operate continuously in a plane perpendicular to the main axis of the bearing.
Figure 7 is a chordal, longitudinal section on line 7—7 of Figure 5.

In the drawings, referring to Figure 1, a longitudinal section is shown through the axis of a tapered roller bearing comprising a plurality of frusto-conical rollers 14, 14 of equal size and uniformly spaced around a main longitudinal axis with all of the said frusto-conical roller axes equally inclined from a common point P in the main longitudinal axis of the bearing. The point P will hereinafter be referred to as the focal point of the roller axes.

The apices $P_1P_1$ of the rollers lie in their respective roller axes and converge toward and are equally distant from the focal point P and also, therefore, from the main longitudinal axis of the bearing. The distance of the roller apices $P_1P_1$ from the focal point P may be determined as required and preferably as hereinafter described. The bearing referred to in Figure 1 has a circular inner race 10 provided with a conical outer surface 12 hereafter referred to as the inner raceway.

The conical inner raceway has a central longitudinal axis which coincides with the main longitudinal axis of the bearing and for this reason has actual rolling contact with the inner sides of the rollers along their entire length and also a coaxial concentric bore or opening to receive a shaft (not shown). The bearing also has an outer race 11 provided with a conical inner surface 13 hereinafter referred to as the outer raceway. The conical outer raceway has a central longitudinal axis which also coincides with the main longitudinal axis of the bearing and therefore also has actual rolling contact with the outer sides of the rollers along their entire length and has a concentric circular outer surface or outside diameter for mounting in a wheel hub, housing or other support (not shown).

The outer race 11 is provided with means for locating, positioning and retaining the rollers 14—14 such as plates 22—22 against a pressure rib 18 to be hereinafter described.

Since all longitudinal axes of the races coincide, the main longitudinal axis of the bearing will hereafter be referred to as the coincidental axis.

Figure 2 shows a bearing with frusto-conical rollers 17—17, focal point P, inner race 10, conical inner raceway 15, inner race bore for shaft, outer race 11, conical outer raceway 16, outer race surface or diameter and means to locate, position and retain the rollers by means of end plates 22, 22 exactly similar to Figure 1. However, whereas the straight line distances from focal point P to large base circles of frusto-conical rollers are of the same value in both Figure 1 and Figure 2, by comparison the straight line distances from roller apices to large base circles of frusto-conical rollers are different. The distances from apices $P_2$ in Figure 2 to roller large base circles of frusto-conical rollers hereafter referred to as large roller end circles is considerably less than the distance from apices $P_1$ in Figure 1 to large roller end circles. Thus roller apices $P_2P_2$ in Figure 2 are a considerably greater distance from focal point P than are roller apices $P_1P_1$ in Figure 1. In both Figure 1 and Figure 2 apices $P_1P_1$ and $P_2P_2$ are purposely located a predetermined distance from focal point P to obtain length of roller apices $C_1$ and $C_2$ less than focal distance C. This feature is hereafter referred to as short roller apices, that is, the roller apices do not extend to but are short of the focal points P—P.

Whether the roller apices are short of the focal point P only a small distance as in Figure 1 or a larger distance as in Figure 2 or a still larger distance as required by conditions, this feature of short roller apices constitutes the important fundamental improvement in tapered roller bearing construction as hereinafter explained.

Inasmuch as all true tapered roller bearings have frusto-conical rolling elements and inasmuch as in operation they create when under load an axial thrust within each roller by reason of the inclined sides of the rollers and inasmuch as it is necessary to restrain said rollers axially by means of a circumferential flange 18 called a pressure rib on one of the races, a very decided friction is set up between the large roller end face and cooperating pressure rib tending to retard the circumferential motion of the rollers at their large ends and causing the rollers to skew in a circumferential direction. This will be clearly understood by the diagrammatic representation in Figure 6 in which a plurality of frusto-conical rollers 17—17 similar in all respects to those of Figure 2 are arranged with their roller axes uniformly radiating in a plane from a coincidental axis perpendicular to said plane having also a roller focal point P in said coincidental axis and having roller apices $P_2P_2$ a given equal distance from focal point P as in Figure 2. Also a portion of a flat circular concentric race 15 is shown joined to a concentric roller restraining or pressure rib 18 all coaxial with the focal point P. During circumferential travel of the rollers under load as from $P_3$ to $P_4$, the roller ends 19, because of the inclined roller sides, are pressed with considerable axial force against the pressure rib 18. The resulting friction retards the circumferential travel of the rollers at their large ends and causes them to skew to some such approximate position as indicated by the dotted roller form 21 around dotted axis QQ. But the short apex type of frusto-conical rollers in my invention tends to follow a circumferential path of radius $C_2$ which is shorter than C and therefore very positively tends to force the rollers when traveling circumferentially from $P_3$ to $P_4$ to assume the position indicated by the dot and dash roller outline 20 around axis RR. The result is that with the proper difference between distances $C_2$ and C, these two opposing forces essentially cancel each other and the correct roller alignment is maintained as shown at P—$P_4$ by the solid line roller 26 around axis P—$P_4$. Furthermore, since the roller tends in my invention to follow a circumferential path of radius $C_2$ which is shorter than C, the tendency is to pull away from and decrease the axial thrust load of roller end face 19 upon pressure rib 18. Furthermore, it can be clearly shown that by positioning the apices $P_2P_2$ on the roller axes such as to make them equally far apart as the respective large roller end circles in Figure 6, then the straight lines from the apex points $P_2P_2$ to the closest points of adjacent frusto-conical rollers in the large roller end circle are perfectly parallel lines.

Referring to Figures 3 and 4, D is the diameter of the large roller end circles and R is the radius, and therefore R is ½ D. F is a straight line distance between the centers of said large roller end circles hereinafter referred to as the circular pitch of the large roller end circles. S is ½ F. For purposes of explanation, consider a similar bearing construction as Figures 1 and 2 but with the difference that all roller apices do coincide with focal point P and also with the further difference that the large end circles of all adjacent rollers touch at single points of contact. Since frustrums of cones have straight sides, the rollers are therefore touching solidly with metal to metal contact along their entire lengths. Let this arrangement be called a solid bearing. Then this construction provides that adjacent sides of adjacent rollers will be exactly parallel. As precise parallelism of adjacent sides of adjacent rollers is one of the important features of the present invention it is necessary to adopt in my invention that angle which exists between any given roller axis in the assumed hypothetical solid bearing and the straight line from its apex to the large base circle. This precise angle is shown in Figures 1 and 2 as angle ANB. It should be understood that the angle ANB cannot be any fraction of a degree off the true value without causing the adjacent roller sides to be out of parallelism.

But it has been found that the precise value for angle ANB and perfect parallelism of adjacent roller sides can be obtained with any desired clearance between those parallel roller sides by changing the roller apices value $C_1$ or $C_2$ in definite relation to the change in diameter D or radius R of the rollers which is to say that the precise value for angle ANB and perfect parallelism of adjacent roller sides can be obtained by moving apices $P_1P_1$ or $P_2P_2$ in proportion to the desired clearance between rollers.

Thus in Figure 1 with a precisely correct angle ANB and with proper raceway diameters apices P₁P₁ are moved along their respective roller axes a short distance from P to obtain a small amount of clearance between perfectly parallel roller sides.

In Figure 2 with a precisely correct angle ANB and corrected raceway diameters apices P₂P₂ are moved along their respective roller axes a considerable distance from P to obtain considerable clearance between perfectly parallel roller sides.

Therefore the rollers 14, 14 are clearly shown in Figure 3 and the rollers 17, 17 are clearly shown in Figure 4 with their adjacent sides spaced apart in parallelism to better maintain proper alignment of the rollers when not under load to be hereinafter discussed.

Referring to Figure 5, an enlarged fragmentary longitudinal section adjacent any roller of the bearing is shown wherein a conically shaped pressure plate 22 is placed adjacent to the small end of the roller 28 and has a bore and outside diameter circular and concentric with the coincidental axis. This pressure plate 22 is cupped around its outer periphery having the form of a true cone for only three quarters of the radial distance from bore to outside diameter. Approximately three quarters of the way out the plate starts to curve radially so that the section is practically axial at the outer circular periphery. This provides a pressure plate with a combined conical inner section and cup-shaped outer section and with the outer circular periphery disposed in a concentric circular surface 24 formed in the outer race 11 and terminated by the integral flange 27 which has a smaller concentric bore 25, and furthermore with the conical section of the pressure plate purposely contacting the end faces of the rollers from essentially their centers and radially outward thereof, that is, radially outside the roller axes at their small ends. This central roller end face contact radially outside the roller axes can be obtained at the small ends of the rollers in three ways, first by flat end shape perpendicular to roller axis, second, by coaxial and concentric convex conical roller end shape, and third, by coaxial concentric and slightly concave conical roller end shape, which latter is preferable as shown in the drawings.

The pressure plate 22 is reversely and interchangeably mounted in the outer race 11 adjacent the large end of the roller in a similar concentric circular surface 24 terminated by a similar flange 27 provided with a smaller bore 25 adjacent the large roller end faces so that in the reverse position as shown the conical portion of the plate 22 will contact the large end faces of the rollers from their centers and radially inward thereof.

The end face 19 of the roller at its large end has coaxial and concentric with the roller axis a convex conical shape with such conical angle that the end face from the center radially inwardly, that is radially inside the roller axis, forms exactly the same reverse angle as is formed by the small roller end face radially outside the roller axis with straight radial lines adjacent the roller end faces perpendicular to the coincidental axis.

Referring further to Figure 5 and particularly to the flange or rib 18 which is integral with outer race 11, the inner face of the rib has a concave conical surface coaxial and concentric with the coincidental axis of such angular shape that it conforms to and contacts with the large end faces 19 of the rollers from their centers radially outward, that is radially outside the roller axes at their large ends.

The plate 22 is called a pressure plate because it not only tends to hold the rollers at both ends outwardly against raceway 16 but also because one of its most important functions is to continually exert axial pressure against the small roller end faces 29 to force the large roller end faces 19 into continual contact with the pressure rib face 18, thereby maintaining exact location of roller apices P₁P₁, Figure 1, and P₂P₂, Figure 2, at the correct predetermined distance from focal point P.

This is especially important because in actual service the frusto-conical rollers travel around the raceways into and out of the restraining influence of the load and it is important to hold them against the pressure rib when they are in the "no load" zone so they enter the "load" zone and take up a proportionate amount of the load without skewing circumferentially or sliding axially as both actions tend to destroy the rolling surfaces and the efficiency of the roller bearing. Furthermore, the pressure at both ends of the rollers through the central radial contacts between roller end faces, pressure plate, and rib face of itself tends to keep the rollers from skewing.

Furthermore, as important as it may be to provide control of the circumferential and axial location of the roller apices in the direction toward the focal point P, so also is it important to provide for their control in the direction away from the focal point. In other words the protection of the function of the short apices construction further depends upon eliminating wear between the pressure surfaces of the large roller end faces 19 and the pressure rib side 18 to be hereinafter explained.

In Figure 5, the large end of the roller is a convex cone coaxial and concentric with the roller axis. This presents a curved surface of small radius to the larger curved pressure rib side surface 18. This is also shown in Figure 7 wherein a fragmentary, longitudinal, chordal section of the roller is taken on line 7—7 of Figure 5. Thus it will be seen that the contact of the two curved roller end face rib side surfaces in a central radial area obtains essentially a pure rolling action between said curved surfaces. It will be further understood that this central radial roller end face rib side contact is central so long as the rollers are not allowed to tip or skew and is therefore dependent upon the several improved methods of maintaining the circumferential roller alignment aforesaid. It will also be seen in Figure 7 that the difference in curvatures of the concave pressure rib face 18 and the convex roll end 19 permits the roller end face to continually wipe or wedge lubrication across the rib face during rotation in either direction and to build up a film of lubricant between the two surfaces. Further improvement lies in that construction which confines the lubricant by the centrifugal effect of rotation in that annular but radially cut recess 26 shown in Figure 5 in the conical rib face axially adjacent to the end faces of the rollers. The important point is that the lubricant caught or entrapped in the annular recess never gets radially beyond or outside of the rollers by reason of the fact that the conical inclination of the rib face permits cutting this annular recess axially adjacent the ends of the rollers and entirely in the rib face thereby reducing friction to a minimum and eliminating roller end rib face wear.

Further reference is made at this time in Figure 5 to the pressure and retaining plates 22 and to the fact that by coordination of design the angle of the conical section conforms to not only a portion of the small end face of the roller from its center outwardly, but also conforms to a portion of the large end face of the roller from its center inwardly, which is to say that the conical section of plate 22 conforms to portions of the small ends of the rollers radially outside of the roller axes and to portions of large ends of the rollers radially inside of the roller axes, thereby tending to retain the rollers in the outer race. The relation of the radially curved or cup-shaped outer periphery 23 of pressure plate 22 with bores 24 and 25 is such that the pressure plate can be easily forced by radially deflecting the outer periphery through the small bore 25 of the flange 27. When entirely through the bore 25 the peripheral portion 23 tends to expand back to its normal position and is disposed within the bore 24. The pressure plate 22 cannot be forced in the reverse direction because pressure tends only to further expand the outer peripheral portion 23 and results in a tighter fit in the bore 24. Plate 22 at large end of rollers further tends to act as a closure protecting the rolling surfaces from the abrasive action of dirt and also from the loss of lubricant. It is further pointed out that when necessary the plates 22 can be notched as in Figures 2, 4 and 5 around its outer periphery 23 to permit of greater flexibility and circulation of lubricant.

In assembling the bearing one of the interchangeable plates 22 will be secured in the end of the outer raceway adjacent the small ends of the rollers in a manner previously described, and the outer race will then be placed on its side with coincidental axis vertical and with the inserted plate 22 on the under side. The rollers 17—17 or 14—14, as the case may be, will then be inserted in inclined positions with small ends resting upon inserted plate 22 and with large ends engaging conical rib face 18 in the described manner. The second plate 22 will then be inserted so that its convex conical surface shall be adjacent to the convex large roller ends radially inside the roller axes to effectively retain the rollers in the outer race by preventing their radial inward displacement. This outer race assembly may be applied in its housing independently of the inner race which may be inserted and afterwards secured to its supporting shaft or vice versa, whereby a more simplified construction and a more acceptable commercial roller bearing is obtained.

Thus the foregoing disclosures not only offer the new geometric improvements in tapered roller bearings, but by better coordination of design does safeguard and maintain the functions of that geometric improvement by provision for improved circumferential roller alignment, improved axial roller alignment, improved rolling contact of roller end faces, and improved lubrication to better maintain internal bearing clearances whereby said improvements are obtained by means of a plurality of closely related elements of which no one is more or less important than the others and whereby all are required for successful performance of the bearing.

While I have described the preferred embodiments of the invention, it is understood that I am not to be limited thereto inasmuch as changes and modifications may be resorted to without departing from the spirit of the invention as defined in the appended claims.

What is claimed is:

1. A tapered roller bearing comprising inner and outer races provided with conical raceways, and frusto-conical rollers positioned between said races and having rolling engagement with said raceways, said rollers having axial center lines radiating from a common focal point in the common axis of the raceways, said rollers having apices in their respective axes at a common predetermined distance from said focal point, the sides of adjacent rollers being spaced apart and extending in parallelism with respect to each other.

2. A tapered roller bearing comprising inner and outer races provided with conical raceways, frusto-conical rollers positioned between said races and having rolling engagement with said raceways, said rollers having axial center lines radiating from a common focal point in the common axis of the raceways, said rollers having apices in their respective axes at a common predetermined distance from said focal point, and means on one of said races for predeterminately positioning said rollers radially, the sides of adjacent rollers being spaced apart and extending in parallelism with respect to each other.

3. A tapered roller bearing comprising inner and outer races provided with conical raceways, frusto-conical rollers positioned between said races and having rolling engagement with said raceways, said rollers having axial center lines radiating from a common focal point in the common axis of the raceways, said rollers having apices in their respective axes at a common predetermined distance from said focal point, and means on one of said races for predeterminately positioning said rollers radially whereby any desired clearance may be obtained, the sides of adjacent rollers being spaced apart and extending in parallelism with respect to each other.

4. A tapered roller bearing comprising inner and outer races provided with conical raceways having a common coincidental axial center line of the bearing, and frusto-conical rollers positioned between said races and having rolling engagement with said raceways, the axial center lines of said rollers converging to the common focal point of said raceways, said rollers having apices on their respective axial center lines outwardly from the common focal point of the raceways, whereby when the sides of adjacent rollers are spaced apart they extend in parallelism with respect to each other.

5. A tapered roller bearing comprising inner and outer races provided with conical raceways, tapered rollers positioned between said races and having rolling engagement with said raceways, and members detachably mounted on said outer race and engageable with the opposite ends of said rollers radially inward and outward of the roller axes respectively for retaining the latter independently of said inner race, said members being interchangeable.

6. A tapered roller bearing comprising an inner and outer race provided with conical raceways, frusto-conical rollers positioned between said races and having rolling engagement with said raceways, said rollers having portions of the large roller end faces radially inside the axes and portions of the small roller end faces radially outside the axes shaped to a common radial angle, and members on said outer race conforming to said end portions of said rollers for retaining the latter independently of said inner race.

7. A tapered roller bearing comprising an inner and outer race provided with conical raceways, frusto-conical rollers positioned between said races and having rolling engagement with said raceways, said rollers having portions of the large roller end faces radially inside the axes and portions of the small roller end faces radially outside the axes shaped to a common radial angle, and members on said outer race conforming to said end portions of said rollers for retaining the latter independently of said inner race, said members being interchangeable.

8. A tapered roller bearing comprising an inner and outer race provided with conical raceways, frusto-conical rollers positioned between said races and having rolling engagement with said raceways, said rollers having radial portions of the large roller end faces inside their axes and radial portions of the small roller end faces outside their axes formed to a common radial angle, a pressure rib formed integral with said outer race and engageable with the adjacent ends of said rollers, having a circumferential groove formed therein axially of said rollers and adapted to store a lubricant axially adjacent said roller end faces, and members detachably mounted on said outer race and engageable with the opposite ends of said rollers for retaining the latter independently of said inner race.

9. As an article of manufacture, an outer race for a tapered roller bearing having a conical raceway, frusto-conical rollers engaging said raceway and extending therearound in spaced relation, and members mounted on said race axially engaging the opposite ends of said rollers for retaining the latter within said race, said members having cup-shaped outer periphery with radial flexibility whereby it is adapted to pass in one direction through a hole of smaller periphery but unable to pass in the reverse direction.

10. As an article of manufacture, an outer race for a tapered roller bearing having a conical raceway, frusto-conical rollers engaging said raceway and extending therearound in spaced relation, a pressure rib formed integral with said race and engageable with the end faces at the large ends of said rollers, and members mounted on said race axially engaging the opposite ends of said rollers for retaining the latter within said race, said member having cup-shaped outer periphery with radial flexibility whereby it is adapted to pass in one direction through a stepped hole of smaller periphery but unable to pass in the reverse direction.

11. As an article of manufacture, an outer race for a tapered roller bearing having a conical raceway, frusto-conical rollers engaging said raceway and extending therearound in spaced relation, a pressure rib formed integral with said race and engageable with the end faces at the large ends of said rollers, and members detachably mounted on said race axially engaging the opposite ends of said rollers for retaining the latter within said race, said members being interchangeable.

12. A tapered roller bearing comprising inner and outer races provided with conical raceways having a common coincidental axial center line, and frusto-conical rollers positioned between said races and having rolling engagement with said raceways, the axial center lines of said rollers converging to a common focal point in said coincidental axial center line and said rollers having in their own respective axes apices outwardly positioned from the common focal point whereby the rollers tend to follow a circumferential path of smaller radius than that of the raceways.

13. A tapered roller bearing comprising inner and outer races provided with conical raceways having a common coincidental axial center line, and frusto-conical rollers positioned between said races and having rolling engagement with said raceways, the axial center lines of said rollers converging to a common focal point in said coincidental axial center line and said rollers having in their own respective axes apices outwardly positioned from the common focal point whereby when the adjacent sides of adjacent rollers are spaced apart they extend in parallelism.

14. A tapered roller bearing comprising inner and outer races provided with conical raceways having a common coincidental axial center line, and frusto-conical rollers positioned between said races and having rolling engagement with said raceways, the axial center lines of said rollers converging to a common focal point in said coincidental axial center line and said rollers having in their own respective axes apices outwardly positioned from the common focal point whereby the rolling action of the rollers tends to decrease the axial thrust load generated by the inclined roller sides.

15. A tapered roller bearing comprising inner and outer races provided with conical raceways having a common coincidental axial center line, and frusto-conical rollers positioned between said races and having rolling engagement with said raceways, the axial center lines of said rollers converging to a common focal point in said coincidental axial center line, said rollers having in their own respective axes apices outwardly positioned from the common focal point, the adjacent sides of adjacent rollers being spaced apart and extending in parallelism with respect to each other, said rollers having conically shaped large end faces in relatively central radial rolling contact with a conforming rib restraining the rollers in a direction away from the focal point, thereby maintaining the parallel clearance of the roller sides.

16. A tapered roller bearing comprising inner and outer races provided with conical raceways having a common coincidental axial center line, and frusto-conical rollers positioned between said races and having rolling engagement with said raceways, the axial center lines of said rollers converging to a common focal point in said coincidental axial center line, said rollers having in their own respective axes apices outwardly positioned from the common focal point, the adjacent sides of adjacent rollers being spaced apart and extending in parallelism to each other, said rollers having large end faces making relatively central radial conical contact with a pressure rib on one of the races, said rollers having small end faces making relatively central radial contact with an adjacent member attached to one of the races whereby the said positions of the roller apices outwardly from the common focal point are maintained.

17. A tapered roller bearing comprising inner and outer races provided with concentric raceways coaxial with a coincidental axial center line, and frusto-conical rollers positioned between said races and having rolling engagement with said raceways, the axial center lines of said rollers converging to a common focal point in said coincidental axial center line, said rollers having in their own respective axes apices outwardly positioned from the common focal point, the adjacent sides of adjacent rollers being spaced apart and extending in parallelism, said rollers having large end faces making relatively central radial conical contact with a pressure rib on one of the races, said rollers having small end faces in central radial contact with an adjacent conical member attached to one of said races, and means for exerting pressure between said member and small roller end faces whereby the large roller end pressure rib central radial conical contact and the predetermined positions of the roller apices outwardly from the common focal point are constantly maintained.

18. A tapered roller bearing comprising inner and outer races provided with concentric raceways coaxial with a coincidental axial center line, and frusto-conical rollers positioned between said races and having rolling engagement with said raceways, the axial center lines of said rollers converging to a common focal point in said coincidental axial center line, said rollers having in their own respective axes apices outwardly positioned from the common focal point, the adjacent sides of adjacent rollers being spaced apart and extending in parallelism, said rollers having large end faces in relatively central radial conical contact with a pressure rib on one of the races, said rollers having small end faces in central radial contact with an adjacent conical member attached to one of the races, said member exerting end pressure upon the small roller end faces axially through the rollers and through the large roller end faces to the restraining rib, said member having a cup-shaped outer periphery with radial flexibility whereby it is enabled to pass in one direction through a hole of smaller periphery but unable to pass in the reverse direction whereby the predetermined positions of the roller apices outwardly from focal point are constantly maintained.

19. A tapered roller bearing comprising inner and outer races provided with concentric raceways coaxial with a coincidental axial center line, and frusto-conical rollers positioned between said races and having rolling engagement with said raceways, the axial center lines of said rollers converging to a common focal point in said coincidental axial center line, said rollers having in their own respective axes apices outwardly positioned from the common focal point, the adjacent sides of adjacent rollers being spaced apart and extending in parallelism, said rollers having large end faces in relatively central radial conical contact with a pressure rib on one of the races, said rollers having small end faces in central radial contact with an adjacent member exerting end pressure axially through said central radial roller contacts, said member having a cup-shaped outer periphery engaging a circular recess in one of said races with notches in the said outer periphery for the passage of oil into the bearing.

20. A tapered roller bearing comprising inner and outer races provided with conical raceways concentric and coaxial with a coincidental axial center line, and frusto-conical rollers positioned between said races and having rolling engagement with said raceways, the axial center lines of said rollers converging to a common focal point in said coincidental axial center line, said rollers having in their own respective axes apices positioned outwardly from the common focal point, the adjacent sides of adjacent rollers being spaced apart and in parallelism, said rollers having large end faces in relatively central radial conical contact with a pressure rib on one of the races, said roller small end faces in central radial contact with an adjacent pressure plate attached to one of the races to maintain the large roller end pressure rib central radial conical contact, one of said races having a circular recess axially adjacent the large end faces of the rollers to maintain a supply of lubricant radially within reach of the roller end faces at all times to better maintain original bearing clearances, location of apices and correct functioning of the bearing.

21. A tapered roller bearing comprising inner and outer races provided with conical raceways concentric and coaxial with a coincidental axial center line, and frusto-conical rollers positioned between said races and having rolling engagement with said raceways, the axial center lines of said rollers converging to a common focal point in said coincidental axial center line, said rollers having in their own respective axes apices positioned outwardly from the common focal point, the adjacent sides of adjacent rollers being spaced apart and in parallelism, said rollers having large end faces in relatively central radial conical contact with a pressure rib on one of the races, said rollers having small end faces in central radial contact with an adjacent pressure plate attached to one of the races to maintain the large roller end central radial conical contact with said pressure rib, one of said races having a circular recess axially adjacent the roller end faces for lubricant storage within the radial reach of said rollers, and a close conical conformity of pressure plate to portions of the small end faces of rollers radially outside the roller axes and a close conical conformity of a similar plate to portions of the large end faces of the rollers radially inside the roller axes whereby the correct positions of the apices and of the rollers are retained outwardly in the outer race.

22. A tapered roller bearing comprising a plurality of frusto-conical rollers uniformly and equally sized spaced and inclined around a central longitudinal axis, said rollers being disposed between and making rolling engagement with concentric coaxial conical raceways of inner and outer races, said rollers having axial center lines converging uniformly to a focal point in the central longitudinal axis, said rollers having in their respective axes apices at a predetermined equal distance from the focal point whereby a predetermined tendency is obtained of the large ends of the rollers to lead when under circumferential motion and thus to overcome the inherent frictional retardation of large end of rollers.

23. A tapered roller bearing comprising a plurality of frusto-conical rollers uniformly and equally sized spaced and inclined around a central longitudinal axis, said rollers having rolling engagement between concentric and coaxial conical raceways of inner and outer races, said rollers having axial center lines converging uniformly to a focal point in the central longitudinal axis, said rollers having in their respective axes apices at a predetermined equal distance from the focal point, and the adjacent sides of the adjacent rollers being spaced close together and extending in parallelism whereby the roller apices are circumferentially maintained in their correct position.

24. A tapered roller bearing comprising a plurality of frusto-conical rollers uniformly and equally sized, spaced and inclined around a central longitudinal axis and having rolling engagement between concentric and coaxial conical raceways of inner and outer races, said rollers having axial center lines converging uniformly to a focal point in the central longitudinal axis, said rollers having apices in their respective axes at a predetermined equal distance from the focal point, and a central radial conical non-wearing pressure contact at the large end faces of the rollers with conforming pressure rib and a central radial conical non-wearing pressure contact at the small end faces of the rollers whereby the roller apices are axially maintained in their correct positions.

25. A tapered roller bearing comprising a plurality of frusto-conical rollers uniformly and equally sized, spaced and inclined around a central longitudinal axis and having rolling engagement between concentric and coaxial conical raceways of inner and outer races, said rollers having axial center lines converging uniformly to a focal point in the central longitudinal axis, said rollers having apices in their respective axes at a predetermined equal distance from the focal point, and a circular relief in said outer race for storing oil axially adjacent to and within radial reach of the end faces of the rollers whereby wear is eliminated and the predetermined clearances and apices location maintained.

26. A tapered roller bearing comprising a plurality of frusto-conical rollers uniformly and equally sized, spaced and inclined around a central longitudinal axis and making rolling engagement between concentric and coaxial conical raceways of inner and outer races, said rollers having axial center lines converging uniformly to a focal point in the central longitudinal axis, said rollers having apices in their respective axes at a predetermined equal distance from the focal point, said rollers having radial portions inside of their axes at the large roller end faces and outside the axes at the small roller end faces which make equal and opposite angles to straight radial lines adjacent the roller end faces perpendicular to the central longitudinal axis whereby the positions of the said apices and the rollers are retained outwardly as part of the outer race assembly.

27. An outer race assembly of a tapered roller bearing, said outer race having a conical raceway, frusto conical rollers engaging said raceway, a pressure rib on said race engageable with the end faces at the large ends of said rollers, a member mounted on said race conforming to a radial portion of the large ends of said rollers inside their axes and a member mounted on said race conforming to a radial portion of the small ends of said rollers outside their axes for retaining the rollers within said race.

28. An outer race assembly of a tapered roller bearing, said outer race having a conical raceway, frusto conical rollers engaging said raceway, said rollers having axial center lines radiating from a common focal point in the central axis of the raceway, said rollers having apices in their respective axes at a predetermined distance from said focal point, whereby the adjacent sides of adjacent rollers extend in parallelism to each other.

29. An outer race assembly of a tapered roller bearing, said outer race having a conical raceway, frustro conical rollers engaging said raceway, said rollers having axial center lines radiating from a common focal point in the central axis of the raceway, said rollers having apices in their respective axes a common distance from the focal point, said rollers being spaced circumferentially around the raceway an equal and predetermined distance apart and parallelism of the extended sides of said rollers provided by determining the distance from the apices to the focal point proportionate to the distance between the rollers.

30. A tapered roller bearing comprising one or more races having conical raceways, frustro conical rollers engaging said raceways, said rollers having axial center lines radiating from a common focal point in the common central axis of the raceways, said rollers having apices in their respective axes at a predetermined common distance from the said focal point, a pressure rib on one of the races engageable with the end faces at the large ends of said rollers and members mounted in circular recesses in the races at each end of the rollers conforming to radial portions of the large roller end faces inside their axes and to radial portions of the small roller end faces outside their axes to retain the rollers against the pressure rib and so maintain the positions of the apices of the rollers.

31. A tapered roller bearing having an inner race and an outer race provided with conical raceways, tapered rollers positioned between said races and having rolling engagement with said raceways, and members mounted on said outer race axially engaging the opposite ends of said rollers inside their axes for retaining the rollers within said outer race, said members having cup-shaped outer peripheries with radial flexibility whereby they are adapted to pass in one direction through a hole of smaller periphery at the side of the bearing but unable to pass in the reverse direction.

32. A tapered roller bearing having an inner race and an outer race provided with conical raceways, tapered rollers positioned between said races and having rolling engagement with said raceways, and members mounted on said outer race conforming to the end faces of said rollers, said members having cup-shaped outer peripheries with radial flexibility whereby they are adapted to pass in one direction through a hole of smaller periphery at the side of the bearing but unable to pass in the reverse direction.

HARRY E. WISE.